United States Patent

[11] 3,569,814

[72] Inventor Jack Rosenberg
Pacific Palisades, Calif.
[21] Appl. No. 791,909
[22] Filed Jan. 17, 1969
[45] Patented Mar. 9, 1971
[73] Assignee International Business Machines
Corporation
Armonk, N.Y.

[54] PROGRAMMED DIGITAL SERVO CONTROL
INCLUDING REPEATED COMMAND UPDATING
WHEREBY OUTPUT FUNCTION BECOMES
SMOOTHLY VARYING
14 Claims, 3 Drawing Figs.

[52] U.S. Cl. .................................................. 318/573,
318/601, 235/151.11
[51] Int. Cl. ..................................................... G05b 19/24,
G05b 19/28
[50] Field of Search ........................................... 318/20.130,
20.320, 20.370; 235/151.11

[56] References Cited
UNITED STATES PATENTS
2,900,586 8/1959 Spencer et al. ................ 318/(20.130X)
3,365,634 1/1968 Centner et al. ................ 318/(20.320X)

Primary Examiner—T. E. Lynch
Attorneys—Hanifin and Jancin and John H. Holcombe

ABSTRACT: Digital numerical control for a machine tool. A plurality of digitally encoded signals or words, each representing an axis of the machine tool, are periodically supplied to a servo for each axis at a rate of less than 200 per axis per second. The digitally encoded signals update the servo by an amount equal to the value thereof to indicate a new desired position of the machine tool along that axis at that point in time. The servo continuously supplies an error signal representing the difference between the desired and actual position of the machine tool. A drive motor for each axis responds to the corresponding error signal to drive the machine tool along that axis. The error signal is updated at a sufficiently high rate that the inertia of the driven tool operates to smooth the motion thereof.

FIG. I

INVENTOR
JACK ROSENBERG
BY John H. Holcombe
ATTORNEY

PROGRAMMED DIGITAL SERVO CONTROL INCLUDING REPEATED COMMAND UPDATING WHEREBY OUTPUT FUNCTION BECOMES SMOOTHLY VARYING

BACKGROUND OF THE INVENTION

1. Field of the Invention

This invention relates to the control of machine tools or other precise mechanisms, and more particularly, to the digital numerical control of machine tools or other precise mechanisms.

2. Description of the Prior Art

A typical numerical machine tool control configuration includes an interpolator and a plurality of pulse stream to analog converters. Information is stored on a punched tape consisting of instructions to the interpolator for each movement of the machine tool. This information is in the form of a vector and the amount of displacement and time duration for each vector. The interpolator breaks the instruction down into a series of incremental steps for each axis of the machine tool. The output from the interpolator for each axis therefore comprises a continuous train of pulses, the data for each axis being coordinated or synchronized with the other axes involved in the cutting. So far as possible, the pulses for a single axis are spaced uniformly in time to provide periodic commands for relatively smooth servo action.

Each pulse commands a specific increment of movement by the machine tool in the specified direction. In a typical system, the distance commanded by a single pulse from the interpolator is 1/10,000th inch. Therefore, to command a feed rate of 60 inches per minute, or 1 inch per second, the pulse rate from the interpolator to the servo for that axis must be 10,000 pulses per second. A typical maximum feed rate is 180 inches per minute, which necessitates a pulse rate of 30,000 pulses per second.

Each of these pulses is an absolute signal representing a specific increment of movement. Further, all distances are represented by an accumulation of pulses without any means of checking the accuracy of the accumulation. Hence, if any signal goes undetected, or if noise inserts detection of an extra pulse, an absolute error is placed in the system.

The usual machine tool environment is subjected to a great deal of electrical noise generation. In view of the high frequencies of the transmitted pulse trains, the transmission lines and detection circuitry are highly sensitive to noise and are apt to produce noise-generated errors.

Hence, it is an object of the present invention to provide commands to the machine tool servos at very low data frequencies consistent with accurate and smooth axis motion to minimize interpolation computation and to avoid errors from high frequency noise.

SUMMARY

Briefly, a control system for a machine tool to effect control thereof is provided. A processor periodically provides a plurality of digitally encoded signals, each representing an axis of the machine tool. The encoded value of each of the digitally encoded signals represents the distance to be moved by the machine tool along the associated axis during a fixed interval of time. The signals are provided at a rate of less than 200 per axis per second and yet much greater than the stop-start response characteristic of the machine tool. The encoded signal can have error detection or correction bus to prevent the accumulation of errors due to noise. Servo error means is provided for each axis, each responsive to signals for the associated axis from the processor to accordingly alter a representation of the desired position of the machine tool along the axis. Hence, the value of each digitally encoded signal for the axis is added to the immediately prior desired position to thereby indicate a new desired position of the machine tool. The servo error means each continuously compare the representation of the desired position with the actual position of the machine tool so as to continuously supply an error signal representing the difference therebetween. Motive means is provided for each axis operative to drive the machine tool along the associated axis in response to the associated error signal.

In previous digital controls, the input pulse command rate is the product of the distance commanded by each pulse, defined as the electrical resolution, and the desired feedrate. If a more precise machine tool is constructed, requiring an electrical resolution of 1/20,000 inch, the maximum sampling rate required would become 60,000 pulses per second. An advantage of a control system in accordance with the present invention in such an instance is that the sampling rate remains constant with changes in resolution or feed rate; only the size of the digitally encoded command signal will vary. The sampling rate is determined by the physical constants or filter bandwidth of the machine tool drive.

DESCRIPTION OF THE PREFERRED EMBODIMENT

As stated above, prior numeric controls for machine tools employed a separate transmission link from the interpolator to the machine tool servos for each axis. Each communication link comprised a continuous train of pulses, wherein each pulse commands a specific, cumulative increment of movement by the machine tool in the specified direction.

As summarized above, the present invention provides digitally encoded signals or words to servo error means for each axis. The encoded value of each such signal represents the distance to be moved by the machine tool along the associated axis during a fixed interval of time. Hence, each signal, in effect, updates the associated axis servo. The updating occurs at a rate of less than 200 per axis per second, but the resultant operation of the machine tool will appear smooth and continuous. The reason is that the physical portion of a machine tool servo system, consisting of a drive motor, reduction gear, lead screw, and slide or table driven by the screw, is actually a mechanical low-pass filter. For a machine tool intended to make precise drawings by driving a pen, such as a drafting machine, the mass and inertial can be kept low; in this case the mechanical filter may have an upper cutoff frequency of 10 Hz. In the case of metal-working machine tools, the driven system must be massive to remain rigid and precise when carrying heavy workpieces subjected to high cutting loads. Such filters have upper cutoff frequencies ranging from 1 Hz to 3 Hz. Above cutoff, these filters have a response which attenuates very rapidly as the frequency increases, about 12 db per octave. When supplied with properly encoded displacement commands at rates above approximately 10 times the cutoff frequency, the machine tool servo behaves as a linear integrator, producing a smooth slide velocity exactly proportional to the averaged value of the commands. Smaller command values supplied at higher sampling rates will produce no improvement in accuracy or smoothness of motion. A control system design is shown which produces as much precision as the machine tool can deliver, near the theoretical minimum sampling rate. This rate is lower by a factor of 100 to 1000 than previous numerical machine tool control systems.

For applications where only a precise path is required, and variations in velocity along the path, called velocity ripple, are acceptable, then the sampling rates below the cutoff frequency of the servo filter may be employed using the same system design. Examples of such use are line-drawing devices, template-scribing devices, photographic negative makers, and laser beam motion controllers.

In such cases, to achieve the maximum precision of the path generated, it is necessary to adjust electrical portions of the servo for each of the axes included in one system so that the total bandwidth of all servos, including electrical and mechanical portions, are approximately equal. This condition is relatively easy to achieve.

Figure 1:
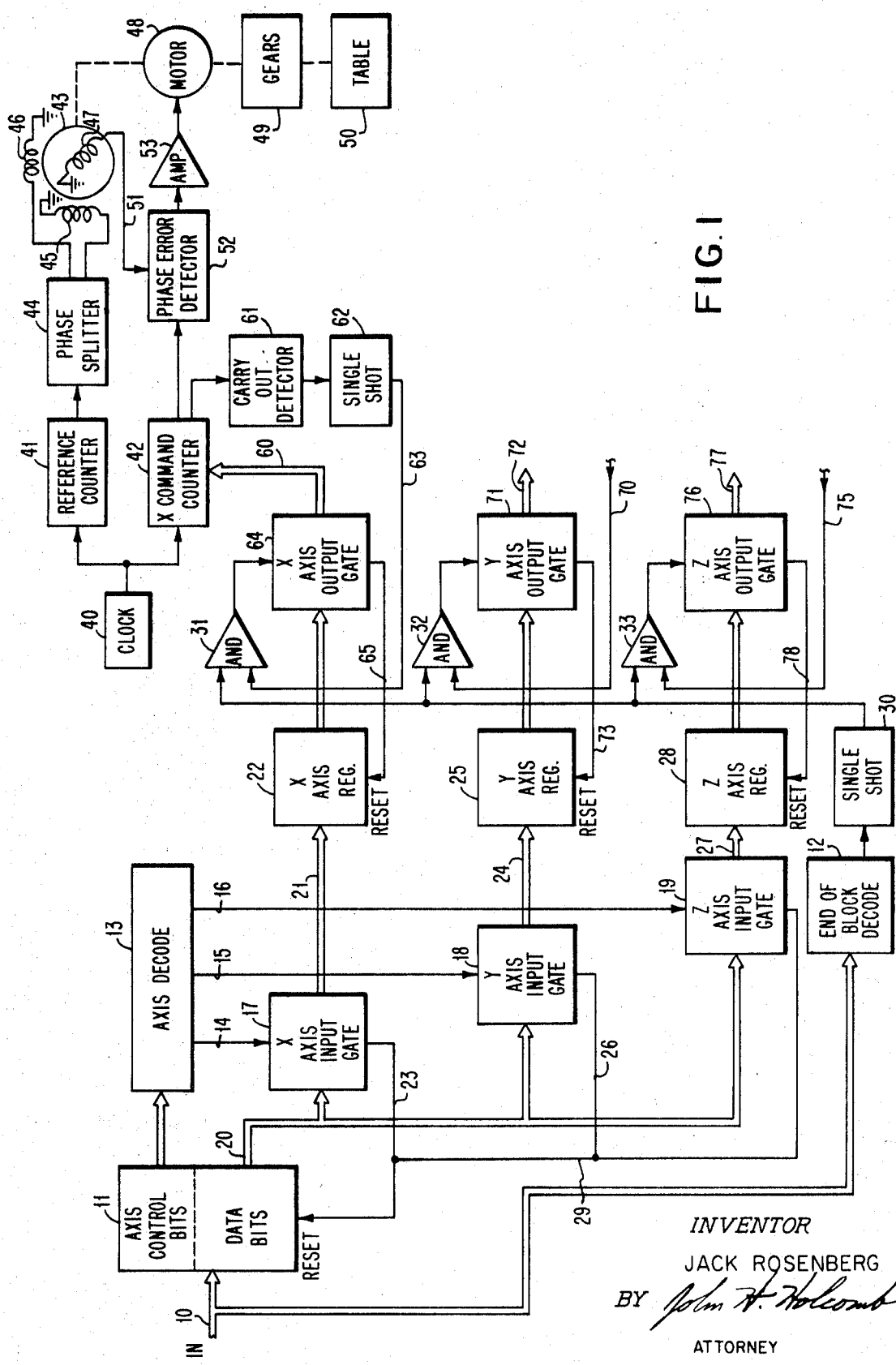
FIG. 1 is a block diagram illustrative of an embodiment of apparatus for controlling a machine tool in accordance with the present invention.

As shown in FIG. 1, the present invention may employ a single communication link 10 for all axes of the machine tool. In the example shown, three axes, X, Y, and Z are shown, although more axes may be added, depending upon the particular machine tool. The actual servomechanism is illustrated for only one axis, although the servomechanisms for the other axes are exact duplicates of that shown. As it comprises the preferred embodiment, the transmission link 10 is shown as a 14-bit wide parallel transmission link, such as a cable. An alternative embodiment would comprise a single serial line together with suitable parallel to serial and serial to parallel converters.

The incoming transmission link 10 is connected to an input word register 11 and to an end block decode circuit 12. Three bit positions of the input register comprise axis control bits. The three bits may be encoded into eight possible combinations. The three selected axes may therefore comprise any three out of the eight possible codes, such as 100 for the X-axis, 010 for the Y-axis, and 001 for the Z-axis. The three axis control bit positions of the register 11 are connected in parallel to axis decode circuitry 13. The axis decoding circuitry decodes the axis control bits and accordingly applies a signal to the line 14—16 which is designated by the bit pattern. Each of these lines comprises the control input terminal to a corresponding parallel gate circuit 17—19.

The 11-bit positions of register 11 comprising the data portion are connected via parallel lines 20 to the three gate circuits. Gate 17 represents the X-axis and, when operated, transmits the data bits over parallel lines 21 to X-axis register 22. Operation of the gate 17 also causes an output signal to appear on line 23 which resets register 11, thereby allowing subsequent receipt of the next parallel word of information on cable 10 by the register 11. Similarly, signal on line 15 operates gate circuit 18 to transmit the data bits appearing on cable 20, via cable 24 to Y-axis register 25, and also to transmit a signal on line 26 to reset the register 11. A signal on line 16 likewise operates gate circuit 19 to transmit the data information via cable 27 to Z-axis register 28 and to transmit a signal on line 29 to thereby reset the register 11.

The circuitry described thus far therefore distributes the incoming words of data to the appropriate axis register 22, 25 or 28 for the subsequent transmission to the servos for the corresponding axes.

At the end of a block of data containing the commanded displacements for all the servos for the chosen time interval, a special set of characters comprising the end of block signal is transmitted on cable 10. This data is detected by decoding circuitry 12 so as to thereby transmit a short pulse to single shot circuit 30. The single shot circuit 30 generates a pulse of predetermined amplitude and duration and transmits this pulse to one input of each of a plurality of AND circuits 31—33. The single shot thereby enables all the AND circuits to allow gating of the data stored in each axis register to the associated servo upon command of that servo.

Referring to the servo for each axis, that for the X-axis is shown, and is identical to the servos for all other axes.

A clock circuit 40, or oscillator, is provided, which in the example shown is arranged to run at a frequency of 2048 kHz. The output of the clock 40 is a string of indiviual pulses. The square wave is applied to a reference counter 41 and to an X-axis command counter 42, each composed of 11 binary counter stages.

The reference counter 41 is essentially a division circuit. The counter produces a positive signal, counts the first 1024 pulses, alters the output to a negative signal, and counts the next 1024 pulses, changing back to the positive state. The output of the reference counter therefore is a square wave at a frequency of 1 kHz.

The X-command counter 42 produces an output at approximately the same frequency as the reference counter 41, but, rather than continuing at the same phase, the phase of the command counter may be altered. It is this difference in phase that continually updates the servo.

A resolver 43 determines the instantaneous actual position of the machine tool. The output of the reference counter 41 is supplied to a phase splitter 44 which breaks the signal into two sine waves 90° apart. These two sine waves are supplied to the stator windings 45 and 46 of the resolver 43. The rotor 47 of the resolver is connected to and positioned by the shaft of motor 48. The motor is also connected to gearbox 49 to drive the X-axis of the machine tool 50.

The resolver 43 operates in a well-known manner to respond to the signals from stators 45 and 46, depending upon the angle of rotation the rotor 47 makes with respect to the stators, thereby producing a signal thereat having a phase dependent upon the physical position of the shaft of the motor 48. This signal appears on line 51 as an input to phase error detector 52. The other input to the phase error detector comprises the output of X-command counter 42. The phase difference between these two signals represents the difference between the actual position of the machine tool as compared to the desired position thereof. This error signal is amplified by amplifier 53 and supplied to drive the motor 48 in a direction to reduce the error to zero.

The command counter 42 may be updated by the addition of data thereto which changes the phase of the output from the command counter. The command counter in the example shown does not operate as a true adder, but may function as an adder by means of a presetting of the counting elements. For the sake of illustration, the command counter comprises an ordinary binary counter. An input cable 60 includes a plurality of lines, each of which are connected to a stage of the counter. When activated, 1 bits appearing on selected ones of these lines will set the corresponding bit positions of the counter to 1. In this manner, a specified binary number may be set into the counter. The counter will then continue to count from the initialized setting.

In order for the command counter to act as an adder, the initialization must occur at the moment the counter is in the all zeroes state. This occurs at the moment the counter completes the count to the 2048th bit and returns to zero. This function of a counter occurs at the carry out time. For a binary counter, this is the instant that all stages of the counter are in the 1 state and an additional bit is received from the clock 40. The counter then steps to the all zeroes state and provides a signal at the carry output thereof.

The carry out detector circuit 61 is connected to the carry output of the command counter 42. This circuit detects the occurrence of a signal at the carry output of the command counter and operates a single shot circuit 62. The single shot circuit then provides a signal of a predetermined amplitude and duration on line 63 to the other input of AND circuit 31.

The coincidence of signals from single shot circuit 30 and from single shot circuit 62 operates the AND circuit 31 to gate the signal from the single shot 62 to X-axis output gate circuit 64. This signal operates the gate circuit to transmit the data from X-axis register 22 on lines 60 to the X-command counter 42. This data presets the command counter to the value of the data contained in the X-axis register, presetting the counter to a specified value and thereby changing the phase of the output signal therefrom. Operation of the X-axis output gate circuit also causes a signal to be supplied on line 65 to thereby reset X-axis register 22.

The servo for the Y-axis is identical to that for the X-axis and operates to transmit a signal on line 70 to enable AND circuit 32 and thereby operate gate 71 so as to transmit the data contents of Y-axis register 25 onto cable 72 to the command counter of the Y-axis servo. Operation of gate 71 also causes the signal to be generated on line 73 to thereby reset the Y-axis register 25. Similarly, the identical Z-axis servo operates to transmit a signal on line 75 to enable AND 33 to operate gate circuit 76 and thereby transmit the data information in Z- axis register 28 via cable 77 to the command counter of the Z-axis servo. Also, the operation of gate 76 causes a signal to appear on line 78 to thereby reset the Z-axis register 28.

The operation of the circuitry of FIG. 1 will now be described with additional reference to the waveforms of FIG. 2.

The incoming data on cable 10 appears as a series of blocks including, in the example shown, four parallel words. Three of the words include axis control bits and data bits and the fourth word comprises the end of block code. These blocks occur repetitively at a constant rate between approximately 10 to 200 per second. This comprises an updating frequency of between 10 and 200 Hz. For the purpose of comparison, the clock 40 in the example shown operates at a rate of 2048 kHz. to drive the counters 41 and 42 at output rates of 1 kHz. Thus, the command counter 42 is updated at a selected rate of once every 100 to 5 output cycles, depending upon the input rate on cable 10.

Assume for the purpose of illustration that the gearing 49 is arranged such that one pulse difference between command counter 42 and reference counter 41 represents 1/10,000th inch of movement of the machine tool along the X-axis. One pulse from each of the clocks for the other axes likewise represent 1/10,000th inch of movement of the machine tool along that axis.

Next assume that the incoming data words represent the following updating of the servos for each axis expressed in units of 1/10,000th inch: X-axis (+100); Y-axis (−75); and Z-axis (0).

The first incoming word on cable 10 therefore includes the three axis control bits of 100 and the data bits represent the binary equivalent of 100. Specifically, the 11 binary data bits will appear in parallel as follows: 00001100100. The full word comprising the axis control bits and the data bits is received by register 11. The axis control bits are transmitted to axis decode circuitry 13 which provides an output signal on line 14. This signal operates X-axis input gate 17 to transmit the data bits on cable 20, via cable 21 to X-axis register 22. The X-axis register 22 now contains the binary equivalent of 100. Operation of the X-axis input gate 17 also provides signal on line 23, resetting register 11.

The immediately following word is then received by the register 11. This word represents the Y-axis and contains the axis control bits 010. The data bits represent the binary equivalent of −75. This is represented by the complement of a +75 which is equal to a full binary word of all ones minus the binary equivalent of 75. A full binary word of all ones is equal to 2048. Subtracting 75 therefrom gives 1973. Hence, the data bits comprise the binary equivalent of +1973. This binary word is 1110110101. The axis control bits are transmitted to axis decode circuitry 13 which responds by providing a signal on line 15. This signal operates Y-axis input gate 18 to transmit the data bits from cable 20, via cable 24 to Y-axis register 25. Hence, the Y-axis register now contains the binary equivalent of −75. Operation of the Y-axis input gate 18 also causes a signal to appear on line 26, resetting register 11.

The register 11 then receives the following word from cable 10, representing the Z-axis. The axis control bits of 001 and the data bits of all zeroes comprise the word so received. The axis control bits are transmitted to axis decode circuitry 13, which provides a signal on line 16. This signal operates the Z-axis input gate 19 to transmit the zero data word from cable 20, via cable 27 to Z-axis register 28. Operation of the input gate 19 also provides a signal on line 29 to reset the register 11. The following word appearing on cable 10 is detected by end of block decode circuitry 12 as the end of block encoded data. Therefore, circuitry 12 provides a signal to single shot 30.

Figure 2:
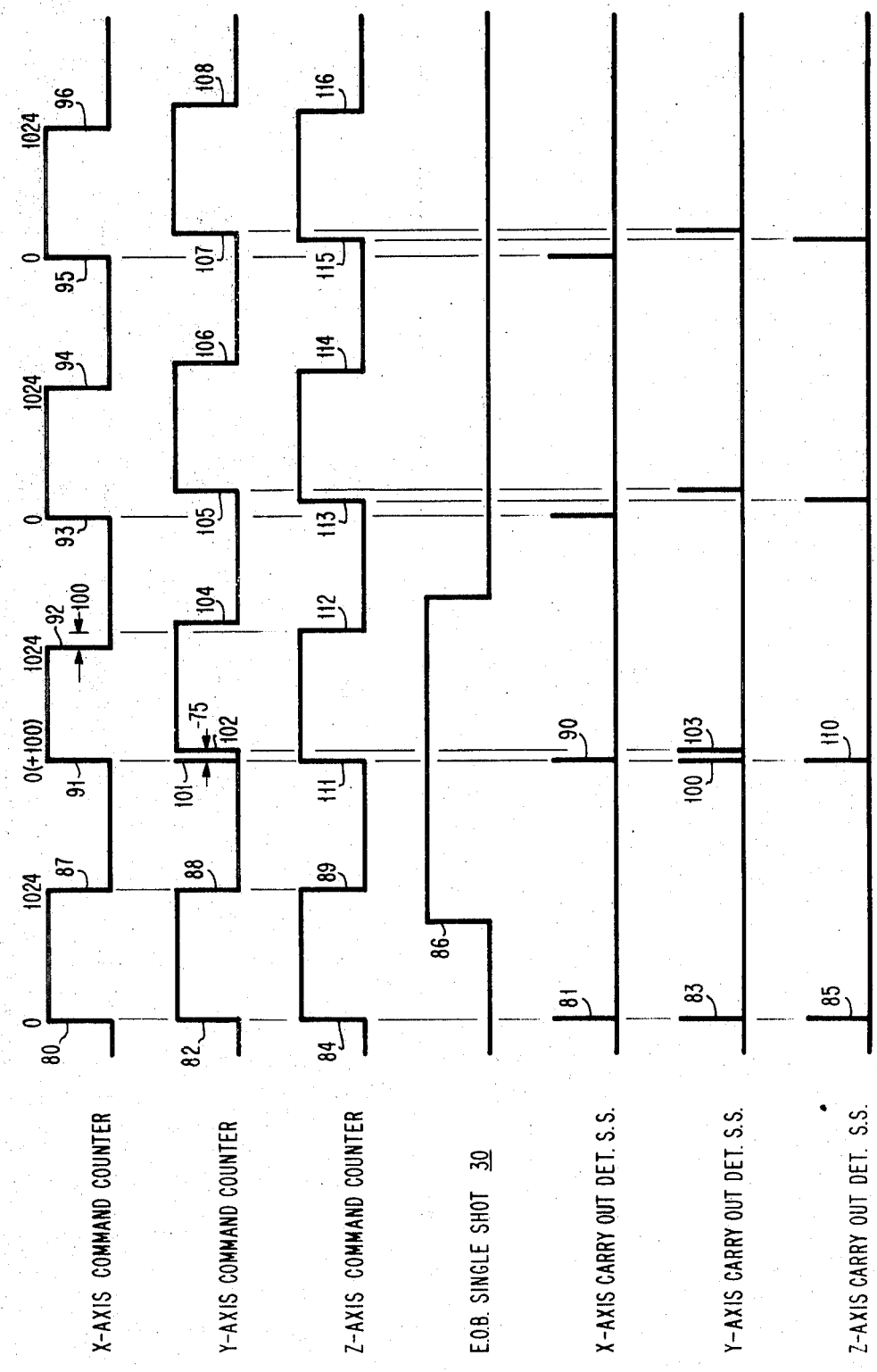
FIG. 2 illustrates waveforms of the operation of certain of the circuits of FIG. 1.

Referring additionally to FIG. 2, the X-axis command counter 42 is shown reaching the full count of 2048 bits and resetting to 0 as shown by the positive-going waveform 80. At this time the command counter 42 supplies a signal to carry out detector 61, which operates single shot circuit 62. The output of single shot circuit 63 is shown as pulse 81.

At approximately the same time the Y-axis command counter is shown changing from all ones to all zeroes by positive-going waveform 82 and producing a carry out pulse from the single shot shown by pulse 83. Likewise, Z-axis command counter is shown changing from all ones to all zeroes by positive-going waveform 84 and producing at a single shot the Z-axis single shot output pulse 85. The various command counters are not necessarily synchronized because they may have received prior different commands, hence, the change of state and the single shot output pulses will in all likelihood not occur at the same time.

At this time, all of the registers 22, 25 and 28 contain appropriate data words and single shot 30 is activated by the end of block decode circuitry 12. The end of block single shot produces the pulse 86 shown in FIG. 2. This pulse is provided to one input of each of the AND circuits 31—33.

Sometime later, the command counters variously reach the count 1024 and alter the output therefrom from a positive state to a negative state. The negative-going signals are represented by waveforms 87—89 shown in FIG. 2.

As X-axis command counter 42 again reaches the all one's state and shifts with the next pulse to an all zeroes state, producing a signal to carry out detector 61, single shot 62 is thereby activated to provide output pulse 90 on line 63. This pulse is gated by AND circuit 31 to thereby operate X-axis output gate 64. This gate transmits the binary equivalent of 100 from X-axis register 22, via cable 60 to the X-axis command counter 42. Hence, rather than maintaining the state of all zeroes, the command counter 42 is preset to a count of 100. The command counter in shifting to the all zeroes state and then to the count of 100, produces positive-going signal 91.

Due to the presetting of the command counter, it will reach the count of 1024 100 cycles of clock 40 earlier than if it had not been preset. The negative-going signal 92 occurring at this time from the command counter is therefore changed in phase from the previous signal 87. The command counter will continue at this new phase represented by the following signals 93—96 until the command counter is again updated.

The change in phase of the command counter now introduces an additional error into phase error detector 52. This change results in the application by the phase error detector 52 of a signal to amplifier 53 to drive the motor 48. Hence, the motor 48 will now drive the machine tool in a direction to reduce the error to zero.

When the Y-axis command counter reaches the all ones state and responds to the next pulse of the clock by producing a carry out signal, the carryout detector and single shot for the axis produces output pulse 100. This output pulse is transmitted via line 70 to AND circuit 32. This AND circuit has as its other input, pulse 86 from the single shot 30. Pulse 100 is thereby transmitted to Y-axis output gate 71, operating the gate to transmit the binary representation of 1973, via cable 72 to the Y-axis command counter. As the Y-axis command counter resets to all zeroes, it momentarily produces positive-going signal 101. However, it is immediately preset to the count of 1973. Hence, this count is beyond the 1024 count, so that the command counter resumes the negative state. Seventy-five counts later, the Y-axis command counter reaches the count of 2048. The counter now produces the positive-going signal 102. The Y-axis command counter also produces a carry out signal at that time which results in the occurrence of pulse 103 on line 70. This pulse is also gated by AND circuit 32 to operate the Y-axis output gate 71. However, the previous operation of the Y-axis output gate caused the signal to appear on line 73 resetting the Y-axis register to all zeroes. Hence, when the gate 71 is operated now, the contents of the Y-axis register 25, all zeroes, is transmitted via cable 72 to the Y-axis command counter. Therefore, there is no change to the count of the command counter.

As a result, the output of the Y-axis command counter is retarded in phase by an amount equal to 75 counts. This new phase is represented by the signals 104—108 shown in FIG. 2.

The new phase of the Y-axis command counter causes the output of the phase error detector for the Y-axis to be altered and thereby transmit an error signal to the Y-axis motor which drives the machine tool along the Y-axis in a direction to reduce the error to zero.

As the Z-axis command counter switches from the all ones to all zeroes state, the single shot associated therewith detects the carry out signal thereof to produce pulse 110. This pulse appears on line 75 and is transmitted by AND circuit 33 to operate the Z-axis output gate 76. This gate circuit transmits the contents of the Z-axis register 28 over cable 77 to the Z-axis command counter. However, the contents of the Z-axis register is all zeroes. Hence, the count of the Z-axis command counter is not altered, and the phase of the output signal therefrom remains unchanged, as is shown by signals 111—116. Without a change in phase, the input to the Z-axis phase error detector remains unchanged with respect to the reference phase, and the lack of an output therefrom causes the Z-axis motor to hold the machine tool stationary with respect to that axis.

Hence, the apparatus described in FIG. 1 is operated to respond to the blocks of received data to distribute the data to the appropriate servos. Each servo has responded to the data representing the associated axis to accordingly alter the phase representation of the desired position of the machine tool along that axis. This updating of the servo for each axis has occurred at a rate of less than 200 per axis per second. The servos each continuously compare the representation of the desired position with the actual position of the machine tool so as to continuously supply an error signal representing the difference therebetween. This error signal has operated to drive the machine tool along the associated axis. The error signal is thus updated at a sufficiently high rate that the inertia of the driven machine tool operates to smooth the motion thereof.

Figure 3:
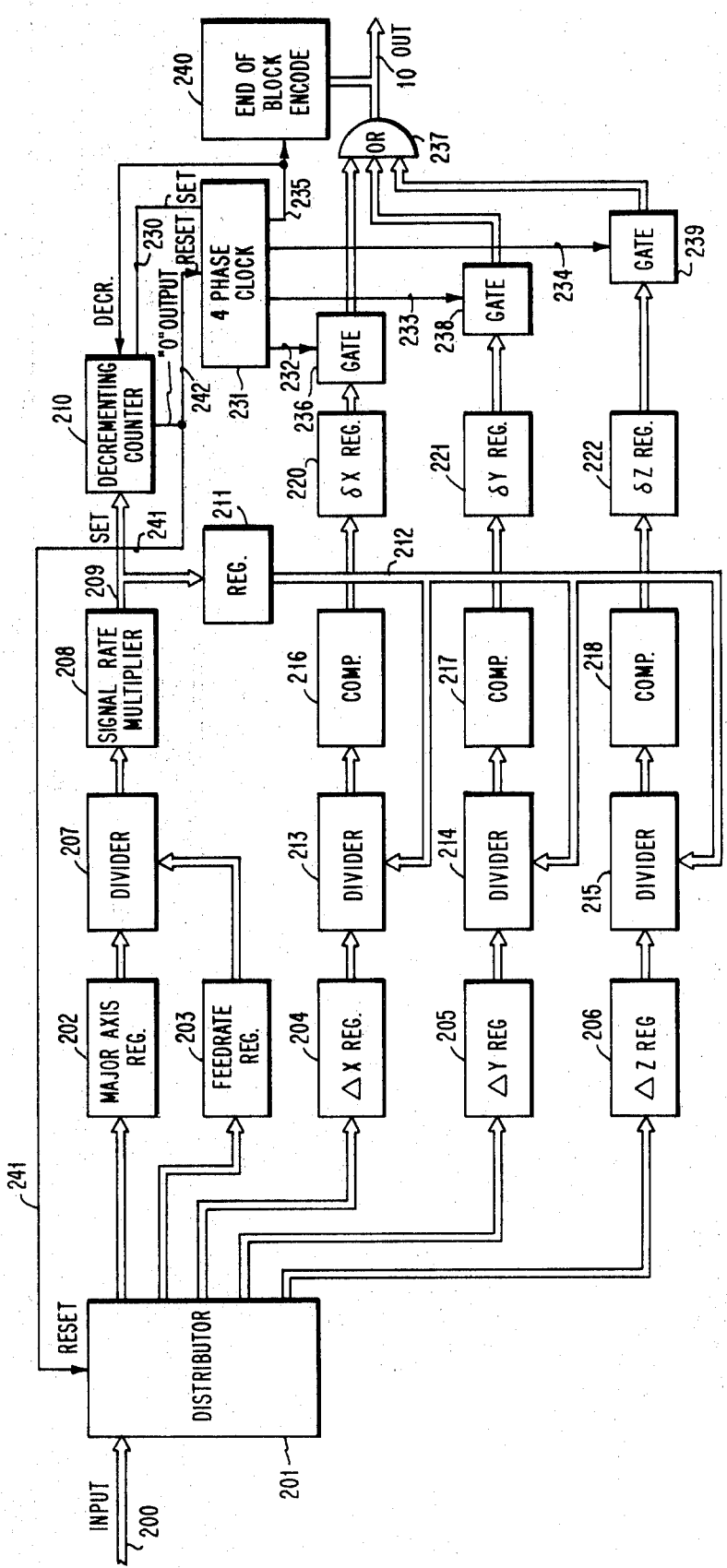
FIG. 3 is a schematic block diagram illustrative of apparatus for generating the signals supplied to the apparatus of FIG. 1.

The circuitry of FIG. 3 operates to derive the blocks of data transmitted on cable 10 to the circuitry of FIG. 1. The input to the system of FIG. 3 appears on parallel cable 200 as supplied by a post processor. Post processors are well known and, for example, may comprise a specially programmed general purpose computer. The post processor per se comprises no part of the present invention.

For each straight line segment of movement for the machine tool, the post processor provides the following information: the total distance to be moved along the major axis; the desired feed rate of the machine tool along the major axis; the total distance and direction to be moved along the X-axis; the total distance and direction to be moved along the Y-axis; and the total distance and direction to be moved along the Z-axis. The major axis is defined as the axis having the largest distance to be moved.

This information is supplied in sequentially occurring records of information on cable 200. A distributor 201 transmits the first received word of a record to major axis register 202, the second word of the record to feed rate register 203, the third word of the record to ΔX register 204, the fourth word of the record to ΔY register 205, the fifth word of the record to ΔZ register 206. A divider 207 responds to the outputs of major axis register 202 and feed rate register 203 to divide the contents of the major axis register by the contents of the feed rate register. The contents of major axis register 202 represents the total distance of the segment to be travelled along the major axis. The contents of the feed rate register 203 represents the desired feed rate along the major axis and, hence, the maximum speed to be travelled by any axis of the machine tool. By dividing, in effect, the distance to be travelled by the feed rate, the output of divider circuit 207 represents the total execution time for the specific segment. This output is supplied to signal rate multiplier circuit 208. Circuit 208 multiplies the output of the divider circuit 207 by a predetermined amount. This amount represents the frequency at which the servos will be updated and may arbitrarily be any rate between 10 and 200 updates per second. As an example, it may multiply the output of divider 207 by 50, representing 50 updates per second.

The result of this multiplication is a number which is transmitted over cable 209 to decrementing counter 210 and to register 211. This number comprises the total number of transmissions to the servos to be made to complete the specific segment. This number is transmitted by register 211 over cable 212 to divider circuits 213—215. Each of the divider circuits responds to the output of the register 211 and to the outputs of the corresponding axis register 204—206 to divide the total distance to be travelled along each axis, contained in registers 204—206, by the total number of transmissions to be sent to the servos for that segment. The output of each of te divider circuits therefore represents the distance to be moved by the machine tool along the associated axis for each separate transmission thereto. The outputs of each of the divider circuits 213—215 are supplied respectively to complementing circuits 216—218. The complementing circuits each detect the value of the sign bit of the output of the associated divider circuit. If the sign bit represents a positive number, the number, without sign bit, is transmitted unchanged. However, if the sign bit indicates a negative number, all bit positions of the binary number are inverted and then transmitted.

The outputs of complementing circuits 216—218 are transmitted respectively to δX-register 220, δY-register 221, and δZ-register 222. These registers store the information ao supplied and additioally supply outputs on three additional lines designating the axis represented by the specific register. For example, δX-register may constantly supply the symbols 100 on the three additional lines. Likewise, δY-register 221 may supply the symbols 010, and δZ-register 222 may supply the symbols 001. As described with respect to the apparatus of FIG. 1, these symbols will control the distribution of the data to the appropriate axis servos.

As stated previously, the output of signal rate multiplier 208, representing the total number of transmissions to the machine tool servos, is transmitted to the "set" input of decrementing counter 210. This input sets the counter to that number and cuases an output signal to be transmitted on line 230 to the "set" input of four-phase clock 231. The clock 231 responds by oscillating at a predetermined frequency. The frequency of oscillation is equal to the multiplication rate provided by signal rate multiplier 208. Hence, for example, the clock may operate at 50 Hz. Each complete oscillation of the clock comprises the production of four sequential pulse outputs occurring respectively on lines 232—235. The first phase signal on line 232 operates gate circuit 236, gating the output of δX-register 220, via OR circuit 237 to transmission link 10. Data designating the X-axis and representing the first increment of movement along the X-axis is thereby transmitted to the apparatus of FIG. 1.

The second phase of clock 210 appearing on line 233 operates gate circuit 238, gating the output of δY-register 221 via OR circuit 237 to transmission link 10. Likewise, the third phase output of clock 231, appearing on line 234 operates gate 239. The gate circuit 239 transmits the output of δZ-register 222, via OR circuit 237 to transmission link 10.

The fourth phase of clock 231, appearing on line 235 is transmitted to end of block encode circuit 240 and to the "-decrement" input of decrementing counter 210. The end of block encoding circuit 240 responds to the signal on line 235 by transmitting the end of block character over transmission link 10. Decrementing counter 210 responds to the signal at the decrement input thereof by reducing the count therein by 1.

The four phase clock 231 continues oscillating and producing signals which cause the transmission of continuing blocks of data to the machine tool over transmission link 10 until the counter 210 is decremented to 0. As the counter decrements to 0, it transmits an output signal on lines 241 and 242. The signal on line 241 is applied to the reset input of distributor 201. This input causes the distributor to be reset back to the initial state so as to be capable of receiving the next input record from cable 200. The signal on line 242 is applied to the reset input of four-phase clock 231. This signal prevents further oscillation of the clock until a new number is set into the decrementing counter.

In the example shown, the four-phase clock 231 is best implemented with a 1 kHz. oscillator and a 20 to 1 division circuit so that the outputs of the division circuit recycle every 50th of a second. The outputs of the division then comprise four consecutive 1 kHz. cycles of the oscillator, comprising the four phases of the clock. This would allow a multiplexing of the transmission link 10 with other possible uses.

The operation of the circuitry of FIG. 3 will now be described in terms of an example. Assume therefore that a straight line segment is to be generated which includes movement along the X-axis of +1.0000 inches movement along the Y-axis of −0.7500 inches, no movement along the Z-axis and a maximum feed rate along the major axis of 1.0000 inches per second.

The inputs to distributor 201 from the post processor on cable 200 therefore will be as follows: (1) the binary equivalent of 1.0000 inches, which is transmitted by the distributor 201 to major axis register 202; (2) the binary equivalent of 1.0000 inches per second, which is transmitted by the distributor to feed rate register 203; (3) the binary equivalent of +1.0000 inches, which is transmitted to the ΔX-register 204; (4) the binary equivalent of −0.7500 inches, which is transmitted to the ΔY-register 205; and (5) the binary equivalent of 0.0000 inches, which is transmitted to the ΔZ-register 206.

The contents of major axis register 202 is supplied to divider circuit 207, where it is divided by the output of feed rate register 203. This division represents the division of the distance to be travelled along the major axis of 1.0000 inches by the maximum feed rate along the major axis of 1.0000 inches per second, equaling a total execution time of 1.0000 seconds. This output is supplied to signal rate multiplier 208, which multiplies an output by a factor of 50 representing the number of samples per second. This product results in a total of 50 samples to be generated. This product is transmitted on cable 209 to the set input of decrementing counter 210 and to register 211.

The contents of register 211 is supplied to divider circuits 213—215. Divider circuit 213 divides the contents of ΔX-register 204, representing the 1.0000 inch total distance to be travelled along the X-axis, by the contents of register 211, representing the 50 samples. The output of divider 213 therefore comprises the number +200, which is transmitted to complementing circuit 216. The complementing circuit notes that the sign of the provided number is a plus and thereby transmits the number unchanged to δX-register 220 unchanged and with the sign bit missing.

Divider circuit 214 divides the contents of ΔY-register 205 representing the 0.7500 inch total distance to be travelled along the Y-axis, by the contents of register 211, representing the 50 samples to be taken. The resultant number of −150 is transmitted to complementing circuit 217. The complementing circuit notes that the sign of the number is a minus and inverts all the binary data bits, transmitting the result to δY-register 221.

Divider circuit 215 divides the all zero contents of ΔZ-register 206 by the contents of register 211, resulting in a zero output to complementing circuit 218. The complementing circuit transmits this all zero input unchanged to δZ-register 222.

The application of the number 50 to the set input of decrementing counter 210 sets the counter to that number, causing the counter to provide a signal on line 230 to the set input of four-phase clock 231. At this time, the clock begins oscillating and providing four sequential signals on lines 232—235.

The signal on line 232 operates gate 236 to transmit in parallel the designation of the X-axis and the data representing the number 200 from δX-register 220, via OR circuit 237 to transmission link 10. The signal on line 233 then operates gate 238 to transmit the Y-axis designation and the binary representation of the complement of the number 150 from δY-register 221, via OR circuit 237, to transmission link 10. The signal appearing on line 234 then operates gate 239 to transmit the designation of the Z-axis and the all zero data of δZ-register 222, via OR circuit 237 to the transmission link 10.

The signal on line 235 then causes end of block encode circuitry 240 to transmit on transmission link 10 the character representation of the end of block. The signal on line 235 is also applied to the decrement input of counter 210, thereby decrementing the counter to 49.

The above operation continues 49 more times until the signal on line 235 causes the counter to decrement to 0. At his time, an output appears on lines 241 and 242. The output on line 241 is applied to reset distributor 201 so as to accept the subsequent input record from cables 200. The signal appearing on line 242 is applied to the reset terminal of four-phase clock 231. This signal causes the clock to stop oscillating so as to cease immediate transmission to the transmission link 10.

The circuitry shown in FIG. 3 may more easily and economically be implemented by the programming of a general purpose computer by well-known techniques. An example of such a computer is the IBM 1800, which may be supplied with programs from IBM which are suitably adapted for the machine tool control environment.

Likewise, the invention exemplified by reference to the above figures may be implemented in an all digital environment where the digital commands are transmitted directly to the digitally responsive motive means, rather than employing the phase responsive servos and digital to phase analogue converters shown in FIG. 1.

While the invention has been particularly shown and described with reference to a preferred embodiment thereof, it will be understood by those skilled in the art that the foregoing and other changes in form and details may be made therein without departing from the spirit and scope of the invention.

I claim:

1. A system for controlling the movement of at least one member of a device along at least one axis in a coordinate system to describe a resulting desired path comprising:

processor means periodically providing at least one digitally encoded word signal, each signal representing, by the encoded value thereof, a predetermined measure of distance to be travelled by a moving member of said device along an associated axis to describe said desired path, said periods comprising relatively long, predetermined, uniform time intervals;

servo error means for each said member of said device, each responsive to each of said word signals from said processor means for that axis to accordingly update a current representation of the desired position of said member along said axis by said predetermined measure of distance, each continuously comparing said representation of said desired position with the actual position of said member, and each continuously supplying an error signal representing the direction and difference therebetween; and servomotive means for each said member of said device operative to continuously urge said member along said axis in response to said error signal for that axis in accordance with the direction and difference represented by said error signal.

2. The control system of claim 1 wherein:

said device has a plurality of axes; and said processor means periodically provides a plurality of digitally encoded word signals, each said signal of said plurality representing a different one of said axes of said device, the encoded value of each of which signals represents a predetermined measure of distance to be travelled by said member along said associated axis to describe said desired path, said periods comprising relatively long, predetermined, uniform time intervals.

3. The control system of claim 1 wherein: said periods at said processor means comprise a predetermined rate of occurrence of less than 200 per second and greater than the minimum at which the inertial characteristics of said member and said servo means for said axis smooths the motion of said member along said axis to a nearly constant velocity, and only one of said word signals is provided for any one axis in one of said periods.

4. The control system of claim 3 for a device having low velocity ripple wherein: said periods at said processor means additionally comprise a rate of occurrence of more than the maximum upper cutoff frequency of the electromechanical filters comprising, for each said axis, the electrical and driven mechanical servo portion of said device for that axis.

5. The control system of claim 2 wherein:
each of said digitally encoded word signals provided by said processor means additionally includes a designation of the axis of said device represented by said signal; and additionally including:
distribution means which responds to said designation included in each of said signals to distribute the digitally encoded portion of each of said signals to the one of said servo error means for said designated axis.

6. The control system of claim 5 wherein: said periods at said processor means comprise a predetermined rate of occurrence of less than 200 per second and greater than the minimum at which the inertial characteristics of each said member and said servomeans for said associated axis smooths the motion of said member along said axis to a nearly constant velocity and only one of said word signals is provided for each of said axes in one of said periods.

7. The control system of claim 6 for a device having low velocity ripple wherein: said periods at said processor means additionally comprise a rate of occurrence of more than the maximum effective upper cutoff frequency of the electromechanical filters comprising, for each said axis, the electrical and driven mechanical servo portion of said device for that axis.

8. The control system of claim 5 additionally including:
transmission means for transmitting said signals from said processor means to said distribution means.

9. The control system of claim 8 wherein:
said processor means is additionally arranged to supply a special signal to said transmission means in each said period indicating that all said digitally encoded signals for that period have been supplied; and
said distribution means is additionally arranged to temporarily store said digitally encoded signals from said transmission means and is responsive to the receipt therefrom of said special signal to then cause transmission of said stored digitally encoded signals to said servo error means.

10. The control system of claim 9 wherein: said processor means is additionally arranged to supply said signals in the form of words, each word comprising an axis designation and a digitally encoded signal for that axis, serially by word to said transmission means such that one word is transmitted for each axis of said device in said period.

11. A method for controlling the movements of members of a device along separate axes in the coordinate system to describe a resulting desired path having servo motive means for each said axis operative to drive said associated member along said associated axis, comprising the following steps:
periodically providing a plurality of digitally encoded word signals, each said signal of said plurality representing a different one of said axes of said device, the encoded value of each of which signals represents a predetermined measure of distance to be travelled by said member along said associated axis to describe said desired path, said periods comprising relatively long, predetermined, uniform time intervals;
updating current representations of the desired position of said member along each of said axes by said predetermined measures of distance in accordance with the corresponding ones of said plurality of digitally encoded word signals;
continuously comparing, at each of said axes, said representation of said desired position with the actual position of said member along the axis and thereby supplying an error signal representing the direction and difference therebetween; and
operating said servo motive means for each said axis in accordance with said error signal for that axis to thereby continuously urge said member along said axis in accordance with the difference represented by said error signal in a direction tending to reduce said error signal to zero.

12. The method of controlling the operation of a device of claim 11 wherein: said step of periodically providing a plurality of digitally encoded words signals additionally comprises providing said plurality of signals at a predetermined rate of less than 200 per axis per second and greater than the minimum at which the inertial characteristics of each said member and said servo motive means for said associated axis smooths the motion of said member along said axis to a nearly constant velocity, and only one word signal is provided for each axis in one period.

13. The method of claim 12 for controlling the operation of a device having low velocity ripple wherein: said step of periodically providing a plurality of digitally encoded word signals additionally comprises providing said signals to each said axis at a rate of more than the upper cutoff frequency of the electromechanical filter comprising the electrical and driven mechanical servo portion of said device for that axis.

14. The method for controlling operation of a device of claim 11 wherein:
said step of periodically providing a plurality of digitally encoded word signals additionally comprises providing, with each of said signals, a designation of the axis of said device represented by said signal; and
said altering step comprises responding to each of said axis designations to alter a stored representation of the desired position of said member along said designated axis in accordance with said corresponding digitally encoded signal.